United States Patent
Chen

(10) Patent No.: US 11,233,410 B2
(45) Date of Patent: Jan. 25, 2022

(54) CHARGING SYSTEM AND CHARGING METHOD

(71) Applicant: BOE TECHNOLOGY GROUP CO., LTD., Beijing (CN)

(72) Inventor: Shuo Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 547 days.

(21) Appl. No.: 16/305,479

(22) PCT Filed: Mar. 23, 2018

(86) PCT No.: PCT/CN2018/080197
§ 371 (c)(1),
(2) Date: Nov. 29, 2018

(87) PCT Pub. No.: WO2018/233335
PCT Pub. Date: Dec. 27, 2018

(65) Prior Publication Data
US 2021/0226458 A1 Jul. 22, 2021

(30) Foreign Application Priority Data
Jun. 22, 2017 (CN) .......................... 201710482005.6

(51) Int. Cl.
*H02J 7/00* (2006.01)
*H01M 10/44* (2006.01)
*H01R 13/62* (2006.01)

(52) U.S. Cl.
CPC .......... *H02J 7/0042* (2013.01); *H01M 10/44* (2013.01); *H01R 13/6205* (2013.01); *H02J 7/00034* (2020.01)

(58) Field of Classification Search
USPC ........................................................ 320/114
See application file for complete search history.

(56) References Cited

U.S. PATENT DOCUMENTS

| 2013/0165046 A1 | 6/2013 | Tang et al. |
| 2015/0222142 A1 | 8/2015 | Shirai |
| 2015/0244175 A1* | 8/2015 | Abe ...................... H02J 7/0042 307/104 |

FOREIGN PATENT DOCUMENTS

| CN | 201233696 Y | 5/2009 |
| CN | 203747461 U | 7/2014 |

(Continued)

OTHER PUBLICATIONS

Search Report and Written Opinion for International Application No. PCT/CN2018/080197 dated Jun. 14, 2018.
(Continued)

*Primary Examiner* — Bryce M Aisaka
(74) *Attorney, Agent, or Firm* — Calfee, Halter & Griswold LLP

(57) ABSTRACT

A charging system and a charging method is disclosed. The charging system includes an electronic device and a charging device. The electronic device includes a first electromagnetic module and a first communication module. The charging device includes a second electromagnetic module and a second communication module. The first electromagnetic module includes a first charging interface that can be triggered to move to a first position or a second position based on a preset condition. The second electromagnetic module includes a second charging interface that can hold or release the first charging interface. The first communication module is configured to send indication information to the second communication module based on the preset condition. The second communication module is configured to trigger the second charging interface of the second electromagnetic module to hold or release the first charging interface based on the indication information.

16 Claims, 9 Drawing Sheets

(56) References Cited

FOREIGN PATENT DOCUMENTS

| | | |
|---|---|---|
| CN | 204070552 U | 1/2015 |
| CN | 104362448 A | 2/2015 |
| CN | 104821639 A | 8/2015 |
| CN | 106094832 A | 11/2016 |
| CN | 205864025 U | 1/2017 |
| CN | 106385111 A | 2/2017 |
| CN | 106532826 A | 3/2017 |
| CN | 206164144 U | 5/2017 |
| CN | 107069903 A | 8/2017 |

OTHER PUBLICATIONS

First Office Action for Chinese Patent Application No. 201710482005.6 dated Mar. 25, 2019.

* cited by examiner

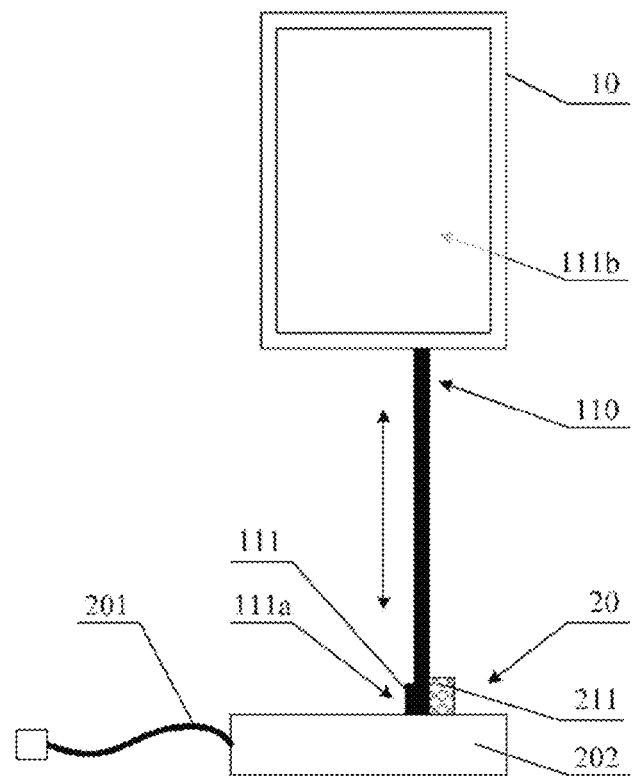
Fig.1
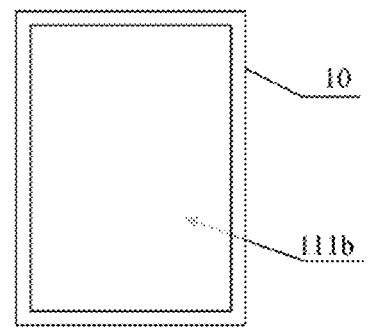
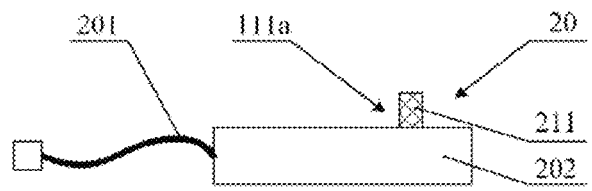
Fig.2 when electricity quantity of the electronic device is less than or equal to a first electricity quantity threshold, triggering the first charging interface to move to the first position, and sending indication information to the charging device, the first position being a position used in cooperation with the second charging interface — S110 / S111 when the electricity quantity of the electronic device is greater than or equal to a second electricity quantity threshold, triggering the first charging interface to move to the second position, and sending indication information to the charging device — S112 the charging device triggering the second charging interface to adsorb the first charging interface based on the charging indication information; or triggering the second charging interface to release the first charging interface based on the charging-finished indication information — S120 when the first charging interface moves to the first position and a magnetic field is generated around the second charging interface, being adsorbed onto the second charging interface through a magnetic component — S130 / S131 when the second charging interface adsorbs the first charging interface, charging the electronic device through a metal component — S132

Fig.11

CHARGING SYSTEM AND CHARGING METHOD

RELATED APPLICATION

The present application is the U.S. national phase entry of PCT/CN2018/074542, with an international filing date of Jan. 30, 2018, which claims the priority of the Chinese patent application No. 201710482005.6, filed on Jun. 22, 2017, which is entirely incorporated herein by reference.

TECHNICAL FIELD

The present disclosure relates to, but is not limited to, the field of wireless charging technology, particularly to a charging system and a charging method.

BACKGROUND

With continuous development and upgrading of electronic devices, various charging modes with respect to the electronic devices come into the market. The charging modes of the electronic devices in the related art generally include wired charging and wireless charging.

At present, for some portable electronic devices, such as smart phones and MP3 players, have implemented wireless charging. For example, when the smart phone has low electricity quantity, a user needs to initiatively place the smart phone on a charging cradle for charging. This charging mode requires the user to determine whether the smart phone is to be charged, and requires the user to initiatively place the smart phone on a fixed position for charging. The wireless charging performed in the above mode has poor intelligence and must be participated by the user. Also, the above wireless charging mode is not applicable for some electronic devices having larger volumes and placed at fixed positions. This type of electronic devices can only be charged in a wired mode at present. For example, for a wall-mounted electronic frame, the electronic frame needs to connect with a charging line. When it needs charging, a connector of the charging line plugs in a charging socket for charging. This charging mode also needs the user to participate, and the external charging line influences appearance of the electronic device.

In conclusion, because the wireless charging modes in the related art need users to determine and participate, they result in poor intelligence in performing the wireless charging modes, and have a smaller application range.

SUMMARY

In order to solve the above technical problem, embodiments of the present disclosure provide a charging system and a charging method for solving the problem of poor intelligence in performing the wireless charging mode due to the wireless charging mode in the related art needing the user to determine and participate, and the problem of a smaller application range of the wireless charging mode.

In one aspect, an embodiment of the present disclosure provides a charging system. The charging system can comprise an electronic device and a charging device. The electronic device can comprise a first electromagnetic module and a first communication module. The charging device can comprise a second electromagnetic module and a second communication module. The first electromagnetic module can comprise a first charging interface that can be triggered to move to a first position or a second position based on a preset condition. The second electromagnetic module can comprise a second charging interface that can hold or release the first charging interface. The first communication module can be configured to send indication information to the second communication module based on the preset condition. The second communication module can be configured to trigger the second charging interface of the second electromagnetic module to hold or release the first charging interface based on the indication information. The charging device charges the electronic device when the second charging interface holds the first charging interface.

In one embodiment, the first electromagnetic module can further comprise a motor connected with the first charging interface. The motor can be configured to move the first charging interface to the first position or the second position through driving of the motor.

In one embodiment, the second electromagnetic module can further comprise an electromagnet module. The electromagnet module can be configured to generate a magnetic field around the second charging interface based on an indication of the second communication module, so as to enable the second charging interface to hold the first charging interface that moves to the first position.

In one embodiment, the first charging interface can comprise a metal component and a magnetic component. The first charging interface can be configured to, when moving to the first position and generating a magnetic field around the second charging interface, be held onto the second charging interface through the magnetic component. The metal component can be configured to, when the second charging interface holds the first charging interface, charge the electronic device.

In one embodiment, the first charging interface being triggered to move to a first position or a second position based on a preset condition can comprise, when electricity quantity of the electronic device is less than or equal to a first electricity quantity threshold, the first charging interface being triggered to move to the first position, the first position being a position used in cooperation with the second charging interface; or when the electricity quantity of the electronic device is greater than or equal to a second electricity quantity threshold, the first charging interface being triggered to move to the second position.

In one embodiment, the indication information comprises charging indication information and charging-finished indication information. The second communication module triggering the second charging interface of the second electromagnetic module to hold or release the first charging interface based on the indication information can comprise, triggering the second charging interface to hold the first charging interface based on the charging indication information, or triggering the second charging interface to release the first charging interface based on the charging-finished indication information.

In one embodiment, the electronic device can further comprise a battery, a power management module and a first processing unit. The first processing unit is connected with the power management module, the motor and the first communication module respectively, and the battery is connected with the power management module. The power management module can be configured to monitor electricity quantity of the battery, and send electricity quantity indication information to the first processing unit based on the electricity quantity of the battery. The first processing unit can be configured to control the first communication module to send the indication information to the second communication module based on the electricity quantity indication information, and control the motor to move the first charging interface to the first position or the second position.

In one embodiment, the charging device can further comprise, a second processing unit, a power management module and a power-supply module. The second processing unit is connected with the power management module, the electromagnet module and the second communication module respectively, and the power-supply module is connected with the power management module and the second charging interface respectively. The second processing unit can be configured to control the electromagnet module to generate an magnetic field or release a magnetic field based on the indication information received by the second communication module. The power-supply module can be configured to convert an AC current into a DC current and then output it to the second charging interface. The power management module can be configured to control and monitor electricity quantity output of the power-supply module. The second processing unit can be further configured to, when stability of the electricity quantity output is less than a preset threshold, control the electromagnet module to regenerate a magnetic field, so as to adjust the second charging interface to hold the first charging interface again.

In one embodiment, the first electromagnetic module can comprise the second charging interface, and the second electromagnetic module can comprise the first charging interface. The second communication module can be configured to trigger the first charging interface to move to a first position or a second position based on the indication information.

In a second aspect, an embodiment of the present disclosure provides a charging method. The charging method can comprise, when an electronic device meets a preset condition, triggering a first charging interface of the electronic device to move to a first position or a second position, and sending indication information to a charging device; the charging device triggering a second charging interface of the charging device to hold or release the first charging interface based on the indication information; and when the second charging interface holds the first charging interface, the charging device charging the electronic device.

In one embodiment, the electronic device is provided with a motor connected with the first charging interface. Triggering the first charging interface to move to a first position or a second position can comprise, moving the first charging interface to the first position or the second position through driving of the motor.

In one embodiment, the charging device is provided with an electromagnet module. The charging device triggering the second charging interface to hold the first charging interface can comprise, the electromagnet module generating a magnetic field around the second charging interface based on the indication information, so as to enable the second charging interface to hold the first charging interface that moves to the first position.

In one embodiment, the first charging interface can comprise a metal component and a magnetic component. The charging device charging the electronic device when the second charging interface holds the first charging interface can comprise, when the first charging interface moves to the first position and a magnetic field is generated around the second charging interface, being held onto the second charging interface through the magnetic component; and when the second charging interface holds the first charging interface, charging the electronic device through the metal component.

In one embodiment, triggering the first charging interface of the electronic device to move to a first position or a second position when the electronic device meets a preset condition can comprise, when electricity quantity of the electronic device is less than or equal to a first electricity quantity threshold, triggering the first charging interface to move to the first position, the first position being a position used in cooperation with the second charging interface; or, when the electricity quantity of the electronic device is greater than or equal to a second electricity quantity threshold, triggering the first charging interface to move to the second position.

In one embodiment, the indication information can comprise charging indication information and charging-finished indication information. The charging device triggering the second charging interface of the charging device to hold or release the first charging interface based on the indication information can comprise, the charging device triggering the second charging interface to hold the first charging interface based on the charging indication information; or, triggering the second charging interface to release the first charging interface based on the charging-finished indication information.

In one embodiment, the charging method can further comprise, the charging device monitoring electricity quantity output in charging, and when stability of the electricity quantity output is less than a preset threshold, adjusting the second charging interface to hold the first charging interface again.

BRIEF DESCRIPTION OF THE DRAWINGS

The drawings are used for providing further understanding to the technical solutions of the present disclosure, and constitute a part of the description. They are used for explaining the technical solutions of the present disclosure together with the embodiments of the present disclosure, and do not constitute limitations to the technical solutions of the present disclosure.

FIG. 1 is a schematic diagram of a charging system in a charging state provided by an embodiment of the present disclosure;

FIG. 2 is a schematic diagram of the charging system of FIG. 1 in a uncharged state provided by an embodiment of the present disclosure;

FIG. 11 is a flow chart of another charging method provided by an embodiment of the present disclosure;

DETAILED DESCRIPTION

In order to enable objects, technical solutions and advantages of the present disclosure to be more clear, the embodiments of the present disclosure will be explained below in detail in conjunction with the drawings. It should be noted that embodiments in the present application and features in the embodiments can be arbitrarily combined with each other without a conflict.

The following several specific embodiments provided by the present disclosure can be combined with each other. The same or similar concepts or processes would not be repeated in some embodiments.

Figure 3:
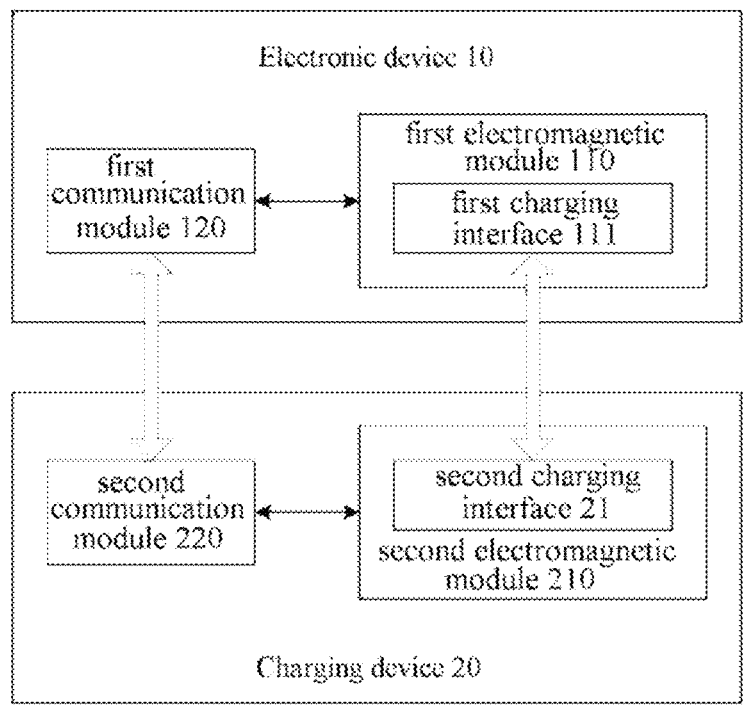
FIG. 3 is a schematic diagram of functional modules of a charging system provided by an embodiment of the present disclosure.

FIG. 1 is a schematic diagram of a charging system in a charging state provided by an embodiment of the present disclosure. FIG. 2 is a schematic diagram of the charging system in FIG. 1 in a uncharged state provided by an embodiment of the present disclosure. FIG. 3 is a schematic diagram of functional modules of a charging system provided by an embodiment of the present disclosure. The charging system provided by the embodiment can comprise, an electronic device 10 and a charging device 20. The electronic device 10 comprises a first electromagnetic module 110 and a first communication module 120. The charging device 20 comprises a second electromagnetic module 210 and a second communication module 220.

The charging system provided by the embodiment of the present disclosure can perform wireless charging to an electronic device having a larger volume and arranged at a fixed position. The electronic device 10 in the embodiment of the present disclosure is an electronic device, such as an electronic frame, that can be hung on the wall. Generally, the electronic frame can be fixed or hung on the wall, and the display screen faces outward in a user visible state for exhibiting photographs or pictures as decoration. In one embodiment, the first communication module 120 is for example a wireless communication module arranged inside the electronic frame. The first electromagnetic module 110 can be arranged at the back of the electronic frame, i.e., a side of the electronic frame facing the wall. When the electronic frame is not in a charging state, the first electromagnetic module 110 can be hidden at the back of the electronic frame and does not influence appreciation of the electronic frame. However, the skilled person in the art should be aware that positions of the first electromagnetic module 110 and the first communication module 120 are not limited to this, and can be any appropriate positions.

The charging device 20 in the embodiment of the present disclosure can be a charging pile for charging the electronic frame. The charging pile can be placed at a corresponding position below the electronic frame, for example, being placed just below the electronic frame (as shown in FIG. 1 and FIG. 2). The charging pile 20 can have a power line 201, which can be generally connected with a household power socket. The charging pile 20 can also have a charging base 202. The second communication module 220 can also be a wireless communication module arranged inside the charging pile. The second electromagnetic module 210 can be arranged above the charging base 202 and is located at a position corresponding to the first electromagnetic module 110, so as to cooperate with the first electromagnetic module 110 for charging.

The first electromagnetic module 110 of the electronic device 10 in the embodiment of the present disclosure can comprise a first charging interface 111 which can be triggered based on a preset condition, so as to move to a first position 111a or a second position 111b. The first communication module 120 can be configured to send indication information to the second communication module 220. The second electromagnetic module 210 can comprise a second charging interface 211 which can hold or release the first charging interface 111 based on the indication information. The second communication module 220 can be configured to trigger the second charging interface 211 of the second electromagnetic module 210 based on the indication information sent by the first communication module 120, so as to hold or release the first charging interface 111. According to the present disclosure, when the second charging interface 211 holds the first charging interface 111, the charging device 20 charges the electronic device 10. Although FIG. 1 and FIG. 2 show that the first electromagnetic module 110 comprises the first charging interface 111 and the second electromagnetic module 210 comprises the second charging interface 211, the skilled person in the art should be aware that the first electromagnetic module 110 can comprise the second charging interface 211 and the second electromagnetic module 210 can comprise the first charging interface 111. In this case, the second electromagnetic module 210 can trigger the first charging interface 110 based on the indication information sent by the first communication module 120, to move to the first position 111a or the second position 111b. The second charging interface 211 of the first electromagnetic module 110 can hold the first charging interface 111 when the first charging interface 111 moves to the second position 111b, thereby charging the electronic device 10.

In an embodiment of the present disclosure, the first charging interface 111 in the first electromagnetic module 110 of the electronic device 10 can be a movable component. The first position 111a can be a position used in cooperation with the second charging interface 211, i.e., the electronic device 10 can be charged when the first charging interface 111 moves to the first position 111a. The second position 111b of the first charging interface 111 can be a hidden position when the electronic device 10 is not in the charging state, for example, being located at a side of the electronic device 10 facing the wall. In actual applications, the electronic device 10 determines initiatively whether it needs to be charged based on the preset condition. When it is determined that it needs to be charged, the first charging interface 111 is moved to the first position 111a. In the process of charging, the electronic device 10 can also determine initiatively whether the charging is finished. When it is determined that the charging is finished, the first charging interface 111 is moved to the second position 111b, thereby presenting a wireless form of the electronic device 10.

It should be noted that it is not limited in the embodiment of the present disclosure that the first position 111a is a position used in cooperation with the second charging interface 211 and the second position 111b is a hidden position of the first charging interface 111. According to the present disclosure, the position to which the first charging interface 111 can move can be set as needed. In one embodiment, the above first position 111a and the second position 111b can be exchanged. That is, when it is determined that it needs to be charged, the first charging interface 111 is moved to the second position 111b, and after the charging is finished, the first charging interface 111 is moved to the first position 111a. All of the drawings in the embodiments of the present disclosure show by way of example that the first position 111a is a position in the charging state and the second position 111b is a position in the uncharged state.

The electronic device 10 and the charging device 20 in the embodiment of the present disclosure perform information interaction through the first communication module 120 and the second communication module 220. A working condition of the first communication module 120 is the same as a moving condition of the first charging interface 111. The first communication module 120 also sends indication information to the second communication module 210 when the electricity quantity of the electronic device 10 meets a preset condition, i.e., when the electronic device 10 determines that it needs to be charged or determines that the charging needs to be finished, sending indication information to the charging device 20 for indicating that the electronic device 10 needs to be charged or the charging needs to be finished. Correspondingly, the second communication module 220 can determine based on the received indication information that the electronic device 10 needs to be charged or the charging needs to be finished. When it needs to be charged, the first charging interface 111 may have been triggered to move to a position (e.g., the first position 111a) that can cooperate with the second charging interface 211 for charging. In this case, the second communication module 220 triggers the second charging interface 211 to hold the first charging interface 111, so that the charging device 20 can charge the electronic device 10. When the charging needs to be finished, the second communication module 220 triggers the second charging interface 211 to release the first charging interface 111 based on the indication information of the first communication module 120. Subsequently, the first charging interface 111 moves back to the second position 111b. In actual applications, the first communication module 120 and the second communication module 220 in the embodiment of the present disclosure can be wireless communication modules, such as Bluetooth, Wireless-Fidelity (Wi-Fi) etc., for realizing wireless communication between the electronic device 10 and the charging device 20.

The wireless charging mode in the related art is generally applicable for some portable electronic devices, e.g., smart phones, MP3 players etc. A user can, when finding that the electronic device has low electricity quantity, place it on the charging base for charging. This charging mode requires the user to determine whether the smart phone is to be charged and requires the user to initiatively place the smart phone on a fixed position for charging. The wireless charging performed in this mode has poor intelligence, and must be participated by the user. Also, as mentioned above, the wireless charging mode in the related art is not applicable for some electronic devices having larger volumes and placed at fixed positions, and has a smaller application range.

Compared with the wireless charging mode in the related art, the first electromagnetic module 110 arranged in the electronic device 10 according to the present disclosure has a movable first charging interface 111. When the charging condition is met, the first charging interface 111 can be moved to a position used in cooperation with the second charging interface 211 in the second electromagnetic module 210 and electrical connection can be realized by holding the second charging interface 211, thereby charging the electronic device 10. After the charging is finished, the first charging interface 111 can also be moved back to a side of the electronic device 10 facing the wall, thereby having an artistic effect. In addition, information interaction between the electronic device 10 and the charging device 20 is realized through the communication modules, so as to enable the second electromagnetic module 210 to cooperate with the first electromagnetic module 110 for charging. The charging mode performed by the charging system in the embodiment of the present disclosure does not require the user to determine and participate, can initiatively perform the charging and charging finishing processes, has higher intelligence and flexibility, and has a wider application range.

The charging system provided by the embodiment of the present disclosure arranges a communication module and an electromagnetic module on both the electronic device and the charging device used in cooperation with each other. The communication modules are configured to perform information interaction. The electronic device can move the first charging interface of the first electromagnetic module to the position of the second electromagnetic module in the charging device, so that the second charging interface of the second electromagnetic module of the charging device holds the first charging interface, thereby charging the electronic device. After the charging is finished, the communication module of the charging device can trigger the second charging interface to release the first charging interface of the electronic device, so as to enable it to move back to the original position. Because the charging system provided by the embodiment of the present disclosure does not require the user to determine and participate in the charging process and can initiatively control charging and charging finishing through the electricity quantity monitoring of the electronic device, it improves the intelligence and flexibility of the wireless charging mode, and increases the application range of the wireless charging mode.

Further, since the electronic device can withdraw the first electromagnetic module for charging when it does not need to be charged, the charging system provided by the embodiment of the present disclosure can improve appreciation of the electronic device.

Figure 4:
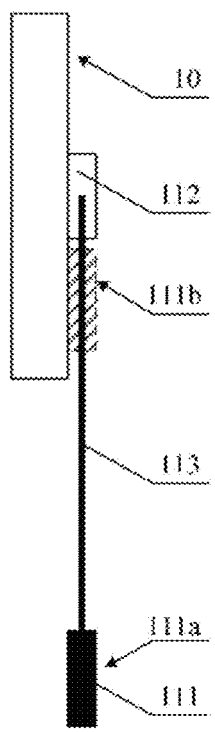
FIG. 4 is a structural schematic diagram of an electronic device of a charging system provided by an embodiment of the present disclosure.

FIG. 4 is a structural schematic diagram of an electronic device in a charging system provided by an embodiment of the present disclosure. In an embodiment of the present disclosure, the first electromagnetic module 110 can comprise a first charging interface 111 and a motor 112 connected with the first charging interface 111. The motor 112 can be configured to move the first charging interface 111 to a first position 111a or a second position 111b through driving of the motor 112.

In the embodiment of the present disclosure, the motor 112 can be connected with the first charging interface 111 through a charging line 113. The charging line 113 can be an electric wire which has elasticity and can be wounded on the motor 112. Through the driving of the motor 112, the charging line 113 can be released or withdrawn, so as to enable the first charging interface 111 to move up and down for example in the perpendicular direction. FIG. 4 schematically shows the first position 111a and the second position 111b of the first charging interface 111. The first position 111a is for example a position used in cooperation with the second charging interface 211, and the first charging interface 111 at this position can be held by the second charging interface 211. The second position 111b is for example a side of the electronic device 10 facing the wall. At this time, the first charging interface 111 is hidden at the back of the electronic device 10.

Figure 5:
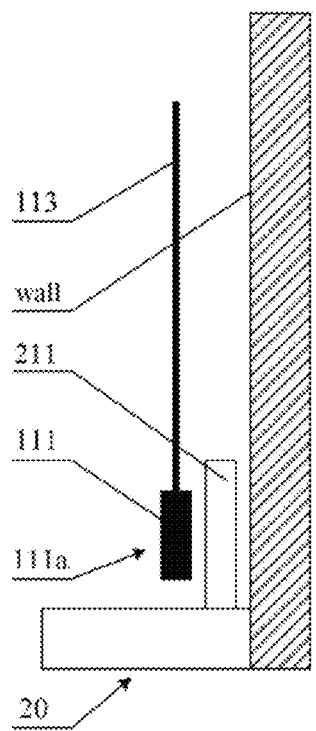
FIG. 5 is a structural schematic diagram of a charging device of a charging system provided by an embodiment of the present disclosure.

FIG. 5 is a structural schematic diagram of a charging device in a charging system provided by an embodiment of the present disclosure. In the embodiment of the present disclosure, the second electromagnetic module 210 can comprise the above second charging interface 211 and an electromagnet module 212 (not shown in FIG. 5).

The electromagnet module 212 is configured to generate a magnetic field around the second charging interface 211 based on indication of the second communication module 210, so as to enable the second charging interface 211 to hold the first charging interface 111 that moves to the first position 111a. In the embodiment of the present disclosure, the electromagnet module 212 is for example an electromagnet structure, and is arranged outside the second charging interface 211. When the electromagnet module 212 receives the indication and determines that charging is needed, it can generate a magnetic field around the second charging interface 211. At this time, the second charging interface 211 has electromagnetic holding capability and can hold the first charging interface 111 that has been located at the first position 111a.

Figure 6:
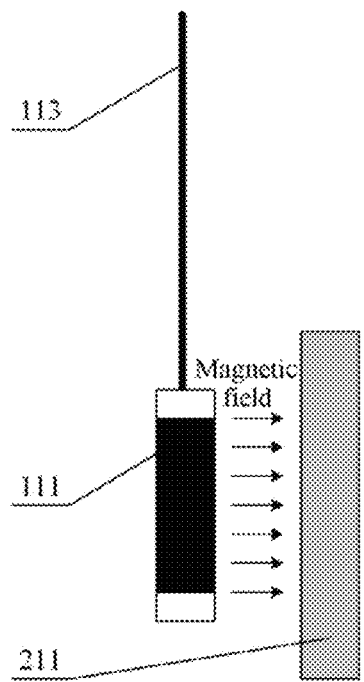
FIG. 6 is a partial side view of a charging system in a charging state provided by an embodiment of the present disclosure.
Figure 7:
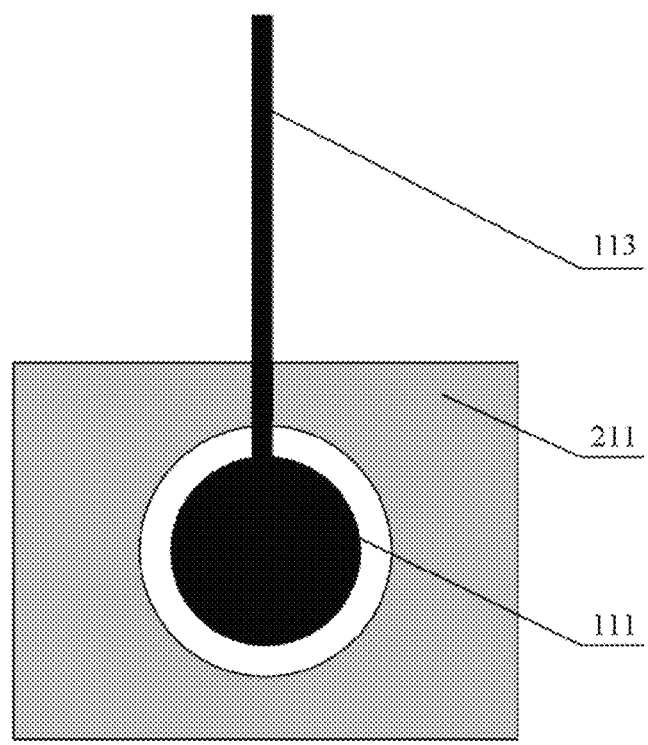
FIG. 7 is a partial front view of a charging system in a charging state provided by an embodiment of the present disclosure.

FIG. 6 is a partial side view of a charging system in a charging state provided by an embodiment of the present disclosure. FIG. 7 is a partial front view of a charging system in a charging state provided by an embodiment of the present disclosure. FIG. 6 schematically shows that the first charging interface 111 is located at the first position 111a, and a magnetic field is generated around the second charging interface 211. At this time, under the effect of the magnetic field, the second charging interface 211 can hold the first charging interface 111. FIG. 7 schematically shows that the first charging interface 111 and the second charging interface 211 are held together. At this time, the charging device 20 can charge the electronic device 10 through electrical connection between the first charging interface 111 and the second charging interface 211.

Figure 8:
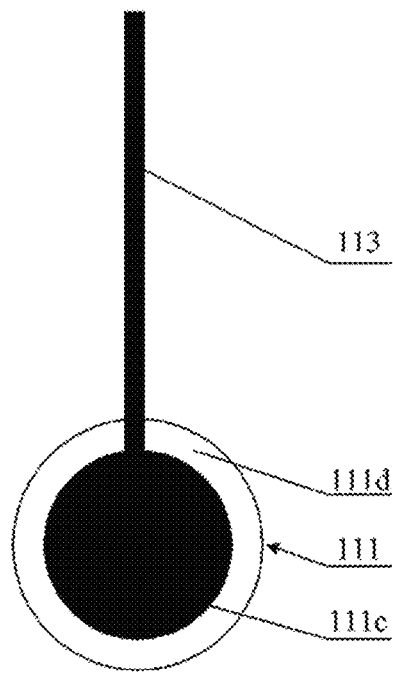
FIG. 8 is a structural schematic diagram of a first charging interface of a charging system provided by an embodiment of the present disclosure.

FIG. 8 is a structural schematic diagram of a first charging interface in a charging system provided by an embodiment of the present disclosure. In the embodiment of the present disclosure, the first charging interface 111 comprises a metal component 111c and a magnetic component 111d.

The first charging interface 111 can be configured to, when moving to the first position 111a and generating a magnetic field around the second charging interface 211, be held onto the second charging interface 211 through the magnetic component 111d. The magnetic component 111d can be an electromagnetic induction coil or a rectifier circuit located at the central part of the first charging interface 111. In this way, when a magnetic field is generated around the second charging interface 211, the first charging interface 111 can be held through the magnetic component 111d, so as to realize contact of the first charging interface 111 and the second charging interface 211.

The metal component 111c can be configured to charge the electronic device 10 when the second charging interface 211 holds the first charging interface 111. Under the state that the second charging interface 211 holds the first charging interface 111, an electrical connection with the second charging interface 211 is realized through the metal component 111c of the first charging interface 111, so as to charge the electronic device 10.

The above embodiments of the present disclosure in actual applications take the residual electricity quantity of the electronic device 10 as a basis for determining whether to be charged or to finish charging.

For example, when the electricity quantity of the electronic device 10 is less than or equal to a first electricity quantity threshold, the first charging interface 111 is triggered to move to a first position 111a. The first position 111a can be a position used in cooperation with the second charging interface 211. When the electricity quantity of the electronic device 10 is greater than or equal to a second electricity quantity threshold, the first charging interface 111 is triggered to move to a second position 111b. The second position 111b can be a position hidden at the back of the electronic device 10. The first electricity quantity threshold can be a threshold when the electronic device 10 is at a low electricity quantity, and for example is 20% of the electricity quantity when it is fully charged. The electricity quantity of the electronic device 10 being less than or equal to 20% of the electricity quantity when it is fully charged shows that the electronic device 10 needs to be charged. The second electricity quantity threshold can be a threshold when the electronic device 10 is at a high electricity quantity or a full electricity quantity, and for example is 90% or 100% of the electricity quantity when it is fully charged. The electricity quantity of the electronic device 10 being greater than or equal to 90% or 100% of the electricity quantity when it is fully charged shows that the electronic device 10 has sufficient electricity quantity at this time, and the charging can thus be finished. The first position 111a and the second position 111b in the embodiment of the present disclosure have been explained in detail in the above embodiments, and thus, it will not be repeated herein.

In the embodiment of the present disclosure, the indication information sent by the first communication module 120 can comprise charging indication information and charging-finished indication information. The second communication module 220 triggers the second charging interface 211 of the second electromagnetic module 210 to hold or release the first charging interface 111 based on the indication information. Specifically, the first communication module 120 sends the charging indication information when it determines based on the preset condition that the electronic device 10 needs to be charged. When the electronic device 10 sends the charging indication information, the second communication module 220 triggers the second charging interface to hold the first charging interface based on the charging indication information. The first communication module 120 sends the charging-finished indication information when it determines based on the preset condition that the charging of the electronic device 10 has been finished. When the electronic device 10 sends the charging-finished indication information, the second communication module 220 triggers the second charging interface 211 to release the first charging interface 111 based on the charging-finished indication information.

Figure 9:
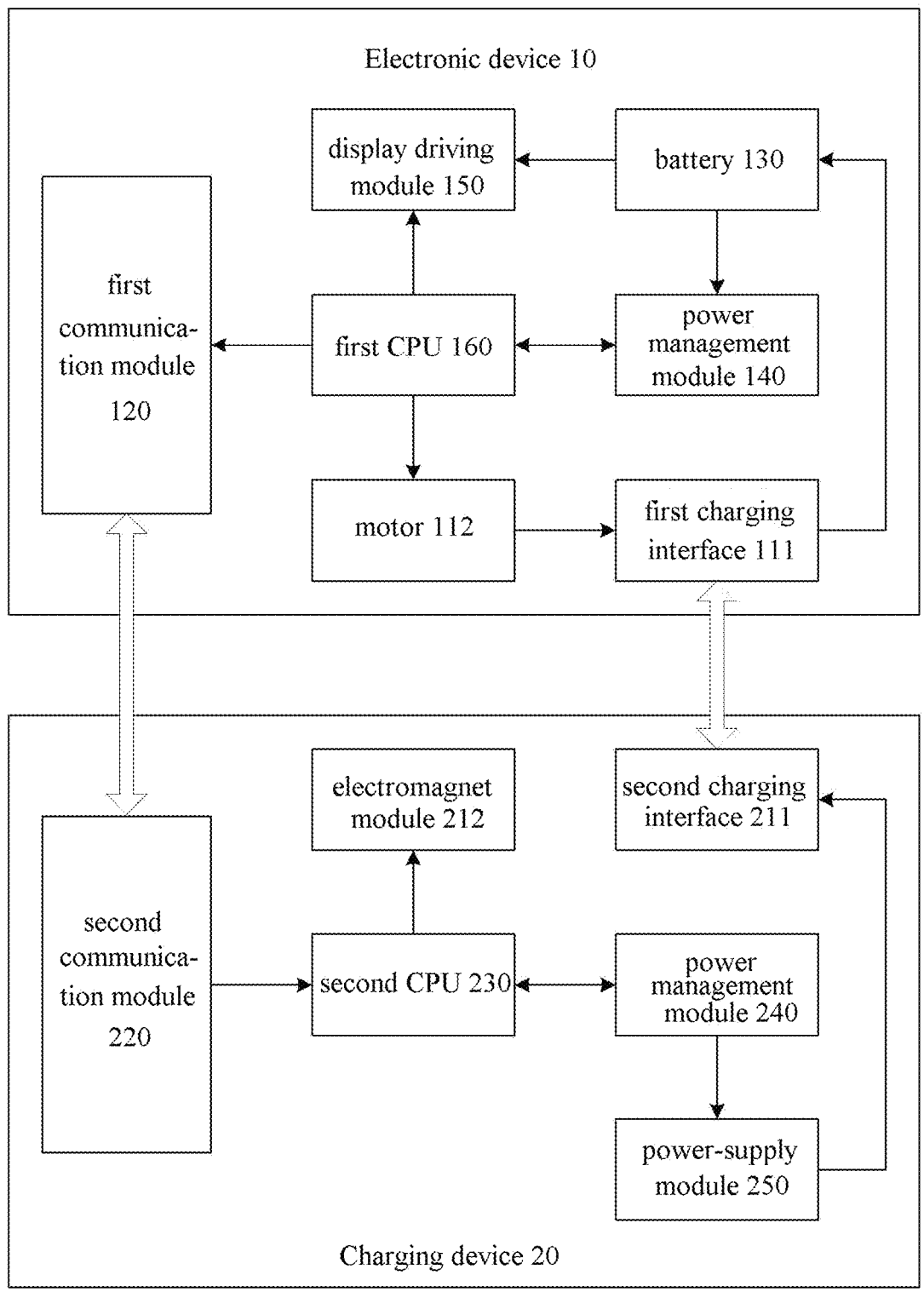
FIG. 9 is a schematic diagram of functional modules of another charging system provided by an embodiment of the present disclosure.

FIG. 9 is a schematic diagram of functional modules of another charging system provided by an embodiment of the present disclosure. On the basis of the module architecture as shown in FIG. 3, the electronic device 10 in the embodiment of the present disclosure can further comprise, a battery 130, a power management module 140, a display driving module 150 and a first central processing unit (CPU) 160. The first CPU 160 is connected with a display driving module 150, a power management module 140, a motor 112 and a first communication module 120 respectively, and the battery 130 is connected with the power management module 140 and the display driving module 150 respectively.

The battery 130 can be configured to provide electrical energy for the electronic device 10, so as to enable the electronic device 10 to implement functions such as display, control, communication and power supply.

The power management module 140 can be configured to monitor the electricity quantity of the battery 130 and send electricity quantity indication information to the first CPU 160 based on the electricity quantity of the battery 130. In actual applications, the electricity quantity indication information can be sent when the electricity quantity of the battery 130 meets a preset threshold. The preset threshold can be the electricity quantity threshold that meets the charging condition or the charging finishing condition in the above embodiments of the present disclosure.

The first CPU 160 can be configured to control the first communication module 120 to send indication information to the second communication module 220 based on the electricity quantity indication information, and control the motor 112 to move the first charging interface 111 to the first position 111a or the second position 111b. In the embodiment of the present disclosure, the electricity quantity meeting the preset threshold shows that the electronic device 10 meets the charging condition or meets the charging finishing condition. Hence, the first CPU 160 needs to control the motor 112 to move the first charging interface 111 to a corresponding position, and indicate, through the first communication module 120, the second communication module 220 to perform corresponding charging operation or charging finishing operation. The first CPU 160 can implement functions such as normal working and wireless charging of the electronic device 10 by controlling the display driving module 150, the power management module 140, the motor 112 and the first communication module 120.

The display driving module 150 can be configured to drive the electronic device 10 to perform image display.

In addition to the above second communication module 220, the second charging interface 211 and the electromagnet module 212, the charging device 20 in the embodiment of the present disclosure can comprise, a second CPU 230, a power management module 240 and a power-supply module 250. The second CPU 230 is connected with the power management module 240, the electromagnet module 212 and the second communication module 220 respectively, and the power-supply module 250 is connected with the power management module 240 and the second charging interface 211 respectively.

The second CPU 230 is configured to control the electromagnet module 212 to generate or release a magnetic field based on the indication information received by the second communication module 220. The second CPU 230 in the embodiment of the present disclosure can implement the wireless charging function of the charging device 20 by controlling the power management module 240, the electromagnet module 212 and the second communication module 220 connected with it.

The power-supply module 250 is configured to convert an AC current into a DC current and then outputting it to the second charging interface 211. The power line on the charging device 20 in this embodiment is connected to the household power socket. The power socket generally provides the AC current. The power-supply module 250 can convert the AC current into a DC current for charging the electronic device 10.

The power management module 240 is configured to control and monitor electricity quantity output of the power-supply module 250 and providing to the second CPU 230 information about the electricity quantity.

The second CPU 230 is further configured to, when stability of electricity quantity output is less than a preset threshold, based on the information provided by the power management module 240, control the electromagnet module 212 to regenerate a magnetic field so as to adjust the second charging interface 211 to hold the first charging interface 111 again.

The power management module 240 in the embodiment of the present disclosure, by controlling and detecting the electricity quantity output of the power-supply module 250, can determine the charging stability of the charging device 20 in the charging state, so as to determine whether the first charging interface 111 and the second charging interface 211 are well held. In the case of poor hold, the second CPU 230 can control the electromagnet module 212 to release and hold the first charging interface 111 again, so as to achieve a good magnetic hold of the first charging interface 111 and the second charging interface 211.

Based on the charging system provided by the above embodiments of the present disclosure, an embodiment of the present disclosure further provides a charging method. The charging method can be carried out by the charging system provided by any of the embodiments as shown in the above FIG. 1 to FIG. 9 of the present disclosure.

Figure 10:
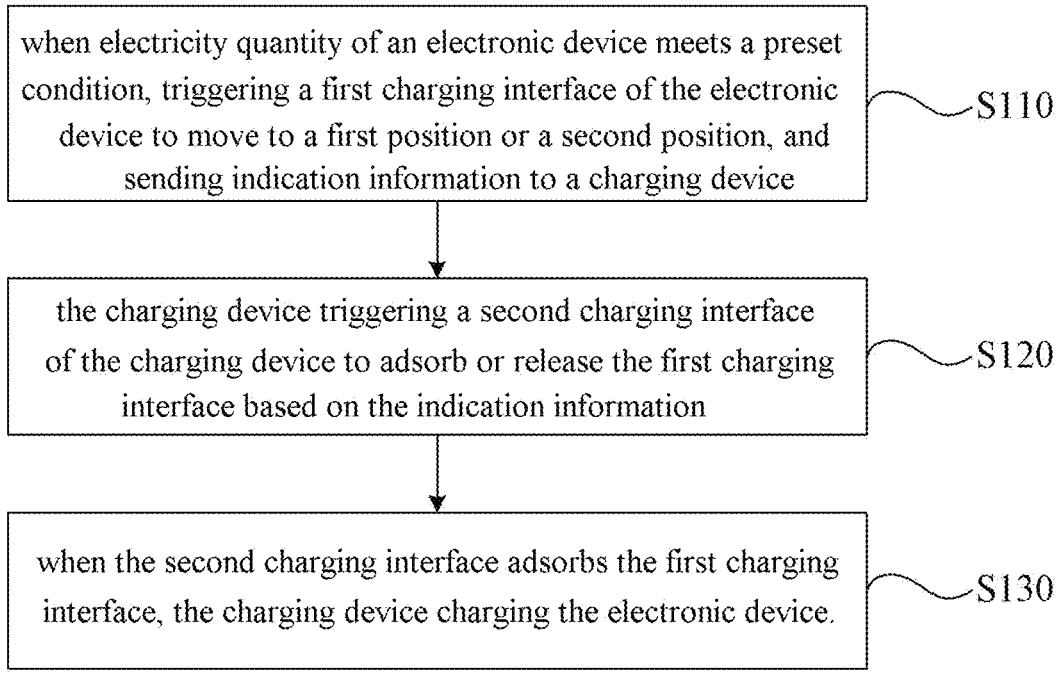
FIG. 10 is a flow chart of a charging method provided by an embodiment of the present disclosure.

FIG. 10 is a flow chart of a charging method provided by an embodiment of the present disclosure. The charging method provided by an embodiment of the present disclosure is a way of performing wireless charging for an electronic device. As shown in FIG. 10, the method provided by the embodiment of the present disclosure can comprise the steps of, S110, when electricity quantity of an electronic device meets a preset condition, triggering a first charging interface of the electronic device to move to a first position or a second position, and sending indication information to a charging device;

S120, the charging device triggering a second charging interface of the charging device to hold or release the first charging interface based on the indication information; and S130, when the second charging interface holds the first charging interface, the charging device charging the electronic device.

In an embodiment of the present disclosure, the first charging interface in the first electromagnetic module of the electronic device can be a movable component. The first position of the first charging interface can be a position used in cooperation with the second charging interface, i.e., the electronic device can be charged when the first charging interface moves to the first position. The second position of the first charging interface can be a hidden position of the first charging interface when the electronic device is not in the charging state, and for example, is located at a side of the electronic device facing the wall. In actual applications, the electronic device determines initiatively whether it needs to be charged when the electricity quantity thereof meets the preset condition. When it is determined that it needs to be charged, the first charging interface is moved to the first position. In the charging finishing process, the electronic device can also determine initiatively whether the charging is finished. When it is determined that the charging is finished, the first charging interface is moved to the second position, thereby presenting a wireless charging form of the electronic device.

The electronic device and the charging device in the embodiment of the present disclosure perform information interaction through the first communication module and the second communication module. The working condition of the first communication module is the same as the moving condition of the first charging interface. Also when the electricity quantity of the electronic device meets a preset condition, indication information is sent to the second communication module. That is, when the electronic device determines that it needs to be charged and determines that the charging is finished, indication information is sent to the charging device for indicating that the electronic device needs to be charged or the charging is finished. Correspondingly, the second communication module can determine based on the received indication information the electronic device needs to be charged or the charging is finished. If it needs to be charged, when the first charging interface has moved to a position (e.g. the first position) that can cooperate with the second charging interface for charging, the second communication module can trigger the second charging interface to hold the first charging interface, so that the charging device can charge the electronic device. If the charging needs to be finished, the second communication module triggers the second charging interface to release the first charging interface. Subsequently, the first charging interface moves to the second position. In actual applications, the first communication module and the second communication module in the embodiment of the present disclosure are wireless communication modules such as Bluetooth, Wireless-Fidelity (Wi-Fi) etc., for realizing wireless communication between the electronic device and the charging device.

The charging method provided by the embodiment of the present disclosure carries out the wireless charging mode through the electronic device and the charging device used in cooperation with each other. When the electricity quantity of the electronic device meets the preset condition, the electronic device triggers the first charging interface of the electronic device to move to a first position or a second position and sends indication information to the charging device. Based on the indication information, the charging device triggers the second charging interface of the charging device to hold or release the first charging interface. The charging device charges the electronic device when the second charging interface holds the first charging interface, and releases the first charging interface of the electronic device after the charging is finished, so as to enable it to move to the original position. Because the charging method provided by the embodiment of the present disclosure does not require the user to determine and participate in the charging process and initiatively controls charging and charging finishing through electricity quantity monitoring of the electronic device, it improves intelligence and flexibility of the wireless charging mode, and increases the application range of the wireless charging mode.

Further, since the electronic device can withdraw the first electromagnetic module for charging when it does not need to be charged, the charging method provided by the embodiment of the present disclosure can improve appreciation of the electronic device.

With reference to the electronic device as shown in FIG. 4 it can be seen that the electronic device can be provided with a motor connected with the first charging interface. Hence, the step S110 in an embodiment of the present disclosure can comprise, when the electricity quantity of the electronic device meets a preset condition, moving the first charging interface to the first position or the second position through driving of the motor. The principle and implementation of driving the first charging interface to move by the motor in an embodiment of the present disclosure have been explained in detail in the above embodiments, and will not be repeated herein.

With reference to the charging device as shown in FIG. 5 and the charging principle as shown in FIG. 6 and FIG. 7 it can be seen that the charging device can be provided with an electromagnet module. Hence, in S120 of an embodiment of the present disclosure, the implementation of the charging device triggering the second charging interface to hold the first charging interface can comprise, the electromagnet module generating a magnetic field around the second charging interface based on the indication information, so as to enable the second charging interface to hold the first charging interface that moves to the first position. The principle and implementation of the electromagnet module generating a magnetic field to hold the first charging interface in an embodiment of the present disclosure have been explained in detail in the above embodiments, and will not be repeated herein.

FIG. 11 is a flow chart of another charging method provided by an embodiment of the present disclosure. Referring to the first charging interface comprising a metal component and a magnetic component as shown in FIG. 8, as shown in FIG. 11, the implementation of S130 in an embodiment of the present disclosure can comprise the steps of, S131, when the first charging interface moves to the first position and a magnetic field is generated around the second charging interface, being held onto the second charging interface through the magnetic component;

S132, when the second charging interface holds the first charging interface, charging the electronic device through the metal component.

The composite structure of the first charging interface, the principle of a magnetic hold with the second charging interface, and the principle and implementation of charging in an embodiment of the present disclosure have been explained in detail in the above embodiments, and will not be repeated herein.

In actual application of the above embodiments of the present disclosure, the way of the electronic device determining whether to be charged or to finish charging is finished can comprise, through the residual electricity quantity of the electronic device, determining whether the charging condition or the charging finishing condition is met. Based on this, S110 in an embodiment of the present disclosure can comprise, S111, when the electricity quantity of the electronic device is less than or equal to a first electricity quantity threshold, triggering the first charging interface to move to the first position, and sending indication information to the charging device, the first position being a position used in cooperation with the second charging interface; or S112, when the electricity quantity of the electronic device is greater than or equal to a second electricity quantity threshold, triggering the first charging interface to move to the second position, and sending indication information to the charging device.

It should be noted that S111 and S112 in the embodiment of the present disclosure are performed selectively. After each determination, one operation is performed, and after a next determination, the other operation can be performed.

In an embodiment of the present disclosure, the indication information can comprise charging indication information and charging-finished indication information. When the electricity quantity of the electronic device is less than or equal to a first electricity quantity threshold, the indication information sent by the electronic device can be charging indication information. When the electricity quantity of the electronic device is greater than or equal to a second electricity quantity threshold, the indication information sent by the electronic device can be charging-finished indication information. Based on this, S120 in an embodiment of the present disclosure can comprise, the charging device triggering the second charging interface to hold the first charging interface based on the charging indication information; or, triggering the second charging interface to release the first charging interface based on the charging-finished indication information.

Figure 12:
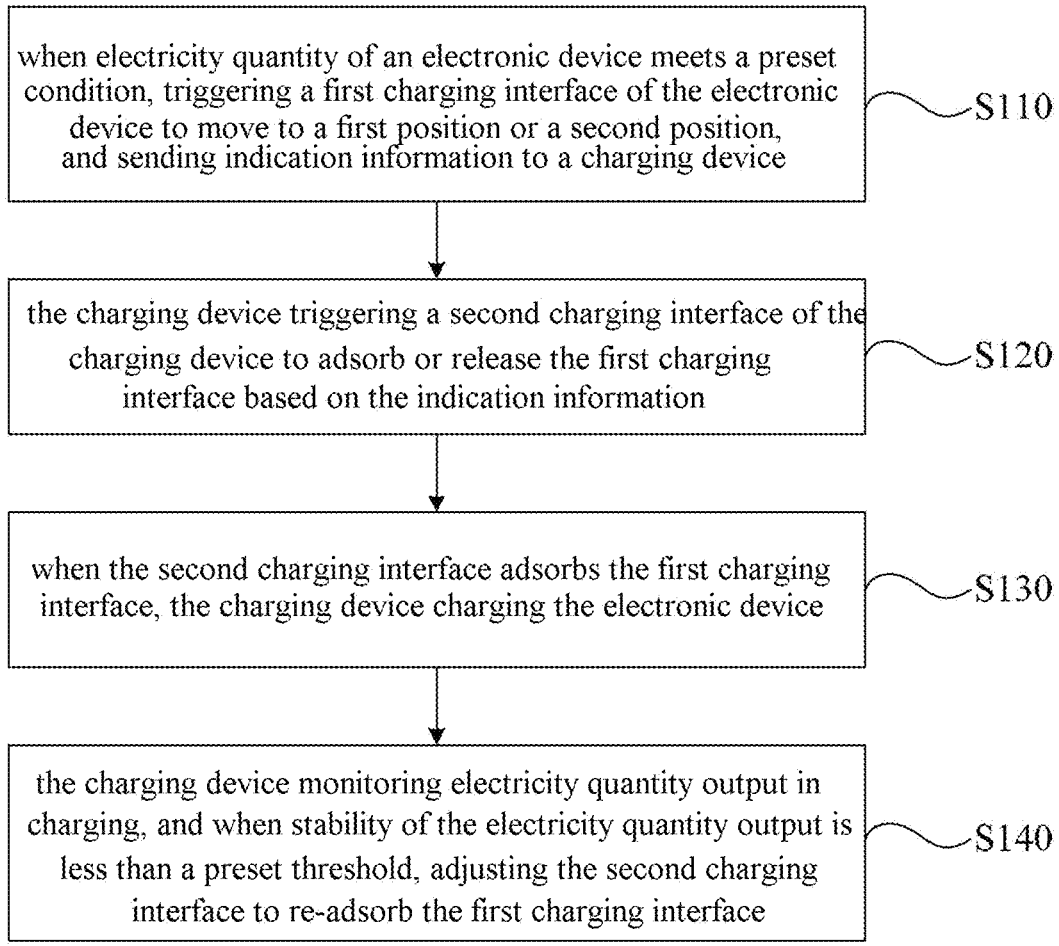
FIG. 12 is a flow chart of a further charging method provided by an embodiment of the present disclosure.

FIG. 12 is a flow chart of a further charging method provided by an embodiment of the present disclosure. On the basis of the above embodiments of the present disclosure, the charging method provided by an embodiment of the present disclosure, in addition to steps S110, S120 and S130, can comprise the step of, S140, the charging device monitoring electricity quantity output in charging, and when stability of the electricity quantity output is less than a preset threshold, adjusting the second charging interface to hold the first charging interface again. The embodiment as shown in FIG. 12 is shown for example, on the basis as shown in FIG. 10.

In an embodiment of the present disclosure, by monitoring electricity quantity output in charging, the charging stability of the charging device in the charging state can be determined, thereby determining whether the first charging interface and the second charging interface are well held. In the case of a poor hold, the second charging interface can be controlled to release and hold the first charging interface again, so as to achieve a good magnetic hold of the first charging interface and the second charging interface, which is benefit for performing efficient charging.

Figure 13:
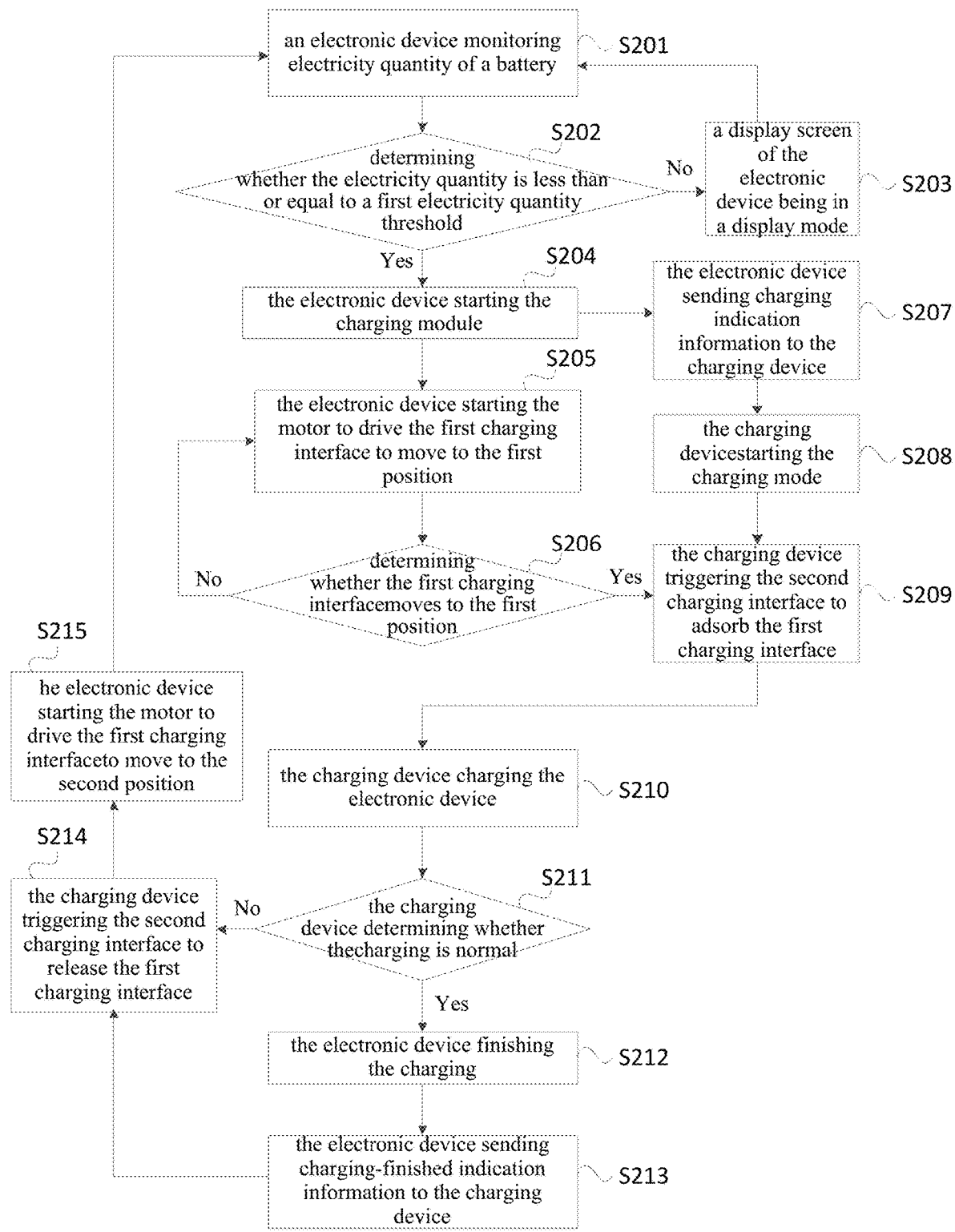
FIG. 13 is a flow chart of yet another charging method provided by an embodiment of the present disclosure.

The charging method provided by an embodiment of the present disclosure will be explained in detail below by an embodiment. FIG. 13 is a flow chart of yet another charging method provided by an embodiment of the present disclosure. The charging method provided by an embodiment of the present disclosure can comprise the steps of (i.e., S201~S215), S201, the electronic device monitoring electricity quantity of a battery;

S202, the electronic device determining whether the electricity quantity is less than or equal to a first electricity quantity threshold; when it is determined that the electricity quantity is greater than the first electricity quantity threshold, performing S203; when it is determined that the electricity quantity is less than or equal to the first electricity quantity threshold, performing S204;

S203, the display screen of the electronic device being in a display mode; and subsequently returning to perform S201;

S204, the electronic device starting a charging module that comprises a first electromagnetic module and a first communication module; and then performing S205 and S207;

S205, the electronic device starting a motor to drive a first charging interface to move to a first position;

S206, the electronic device determining whether the first charging interface moves to the first position; if not, repeating S205; if yes, performing S209;

S207, the electronic device sending charging indication information to the charging device;

S208, the charging device starting a charging mode;

S209, the charging device triggering a second charging interface to hold the first charging interface;

S210, the charging device charging the electronic device;

S211, the charging device determining whether the charging is normal; if the charging is normal, performing S212; if the charging is abnormal, performing S216;

S212, the electronic device finishing the charging;

S213, the electronic device sending charging-finished indication information to the charging device;

S214, the charging device triggering the second charging interface to release the first charging interface;

S215, the electronic device starting the motor to drive the first charging interface to move to a second position; and subsequently, returning to perform S201; and S216, the charging device triggering the second charging interface to release the first charging interface and hold the first charging interface again, and then performing the step S212.

Although the embodiments disclosed by the present disclosure are as above, said contents are only embodiments used for convenient understanding of the present disclosure, and are not used for limiting the present disclosure. Any skilled person in the art of the present disclosure can make any amendments and variations in form and detail of the implementation without departing from the spirit and the scope disclosed by the present disclosure. However, the patent protection scope of the present disclosure still should be subject to the scope defined by the appended Claims.

The invention claimed is:

1. A charging system comprising an electronic device and a charging device, the electronic device comprising a first electromagnetic module and a first communication module, the charging device comprising a second electromagnetic module and a second communication module; and wherein, the first electromagnetic module comprises a first charging interface that can be triggered to move to a first position or a second position based on a preset condition;

the second electromagnetic module comprises a second charging interface that can hold or release the first charging interface;

the first communication module is configured to send indication information to the second communication module based on the preset condition; and the second communication module is configured to, based on the indication information, trigger the second charging interface to hold or release the first charging interface;

wherein the charging device charges the electronic device when the second charging interface holds the first charging interface, or the first charging interface is moved to the second position when the second charging interface releases the first charging interface.

2. The charging system according to claim 1, wherein the first electromagnetic module further comprises a motor connected with the first charging interface; and the motor is configured to move the first charging interface to the first position or the second position through driving of the motor.

3. The charging system according to claim 2, wherein the electronic device further comprises, a battery, a power management module and a first processing unit, the first processing unit being connected with the power management module, the motor and the first communication module respectively, and the battery being connected with the power management module;

wherein the power management module is configured to monitor electricity quantity of the battery, and send electricity quantity indication information to the first processing unit based on the electricity quantity of the battery; and the first processing unit is configured to, control the first communication module to send the indication information to the second communication module based on the electricity quantity indication information, and control the motor to move the first charging interface to the first position or the second position.

4. The charging system according to claim 1, wherein the second electromagnetic module further comprises an electromagnet module; and
the electromagnet module is configured to generate a magnetic field around the second charging interface based on an indication of the second communication module, so as to enable the second charging interface to hold the first charging interface that moves to the first position.

5. The charging system according to claim 4, wherein the first charging interface comprises a metal component and a magnetic component;
the first charging interface is configured to, when moving to the first position and generating a magnetic field around the second charging interface, be held onto the second charging interface through the magnetic component; and
the metal component is configured to, when the second charging interface holds the first charging interface, charge the electronic device.

6. The charging system according to claim 4, wherein the charging device further comprises a second processing unit, a power management module and a power-supply module, the second processing unit being connected with the power management module, the electromagnet module and the second communication module respectively, and the power-supply module being connected with the power management module and the second charging interface respectively;
wherein the second processing unit is configured to control the electromagnet module to generate an magnetic field or release a magnetic field based on the indication information received by the second communication module;
the power-supply module is configured to convert an AC current into a DC current and then output it to the second charging interface;
the power management module is configured to control and monitor electricity quantity output of the power-supply module; and
the second processing unit is further configured to, when stability of the electricity quantity output is less than a preset threshold, control the electromagnet module to regenerate a magnetic field, so as to adjust the second charging interface to hold the first charging interface again.

7. The charging system according to claim 1, wherein the first charging interface being triggered to move to a first position or a second position based on a preset condition comprises,
when electricity quantity of the electronic device is less than or equal to a first electricity quantity threshold, the first charging interface being triggered to move to the first position, the first position being a position used in cooperation with the second charging interface; or
when the electricity quantity of the electronic device is greater than or equal to a second electricity quantity threshold, the first charging interface being triggered to move to the second position.

8. The charging system according to claim 1, wherein the indication information comprises charging indication information and charging-finished indication information; and the second communication module triggering the second charging interface to hold or release the first charging interface based on the indication information comprises,
triggering the second charging interface to hold the first charging interface based on the charging indication information, or
triggering the second charging interface to release the first charging interface based on the charging-finished indication information.

9. The charging system according to claim 1, wherein the first electromagnetic module comprises the second charging interface, and the second electromagnetic module comprises the first charging interface, and wherein the second communication module is configured to trigger the first charging interface to move to a first position or a second position based on the indication information.

10. A charging method comprising,
when an electronic device meets a preset condition, triggering a first charging interface of the electronic device to move to a first position or a second position, and sending indication information to a charging device comprising a second charging interface;
the charging device triggering the second charging interface to hold or release the first charging interface based on the indication information; and
when the second charging interface holds the first charging interface, the charging device charging the electronic device, or
when the second charging interface releases the first charging interface, moving the first charging interface to the second position.

11. The charging method according to claim 10, wherein the electronic device is provided with a motor connected with the first charging interface; and wherein triggering the first charging interface to move to a first position or a second position comprises,
moving the first charging interface to the first position or the second position through driving of the motor.

12. The charging method according to claim 10, wherein the charging device is provided with an electromagnet module; and wherein the charging device triggering the second charging interface to hold the first charging interface comprises,
the electromagnet module generating a magnetic field around the second charging interface based on the indication information, so as to enable the second charging interface to hold the first charging interface that moves to the first position.

13. The charging method according to claim 12, wherein the first charging interface comprises a metal component and a magnetic component; and wherein the charging device charging the electronic device when the second charging interface holds the first charging interface comprises,
when the first charging interface moves to the first position and a magnetic field is generated around the second charging interface, being held onto the second charging interface through the magnetic component; and
when the second charging interface holds the first charging interface, charging the electronic device through the metal component.

14. The charging method according to claim 10, wherein triggering the first charging interface of the electronic device to move to a first position or a second position when the electronic device meets a preset condition comprises,
when electricity quantity of the electronic device is less than or equal to a first electricity quantity threshold, triggering the first charging interface to move to the first position, the first position being a position used in cooperation with the second charging interface; or when the electricity quantity of the electronic device is greater than or equal to a second electricity quantity threshold, triggering the first charging interface to move to the second position.

15. The charging method according to claim 10, wherein the indication information comprises charging indication information and charging-finished indication information; and wherein the charging device triggering the second charging interface to hold or release the first charging interface based on the indication information comprises, the charging device triggering the second charging interface to hold the first charging interface based on the charging indication information; or triggering the second charging interface to release the first charging interface based on the charging-finished indication information.

16. The charging method according to claim 10, further comprising, the charging device monitoring electricity quantity output in charging, and when stability of the electricity quantity output is less than a preset threshold, adjusting the second charging interface to hold the first charging interface again.

* * * * *